US008370850B2

(12) United States Patent
Nochimowski et al.

(10) Patent No.: US 8,370,850 B2
(45) Date of Patent: *Feb. 5, 2013

(54) CACHE MANAGEMENT

(75) Inventors: Alain Nochimowski, Tel Aviv (IL); Amir Mosek, Tel Aviv (IL)

(73) Assignee: SanDisk IL Ltd., Kfar Saba (IL)

( * ) Notice: Subject to any disclaimer, the term of this patent is extended or adjusted under 35 U.S.C. 154(b) by 1243 days.

This patent is subject to a terminal disclaimer.

(21) Appl. No.: 12/036,440

(22) Filed: Feb. 25, 2008

(65) Prior Publication Data

US 2009/0172694 A1  Jul. 2, 2009

Related U.S. Application Data

(60) Provisional application No. 61/018,644, filed on Jan. 2, 2008, provisional application No. 61/018,979, filed on Jan. 4, 2008.

(51) Int. Cl.
*G06F 3/00* (2006.01)
*G06F 9/44* (2006.01)
*G06F 9/46* (2006.01)
*G06F 13/00* (2006.01)

(52) U.S. Cl. ............... 719/313; 711/123; 711/129

(58) Field of Classification Search .......... 719/313; 711/123, 129

See application file for complete search history.

(56) References Cited

U.S. PATENT DOCUMENTS

| 5,509,134 | A | 4/1996 | Fandrich et al. | |
|---|---|---|---|---|
| 6,745,286 | B2 | 6/2004 | Staub et al. | |
| 6,748,467 | B2 | 6/2004 | Yamamoto | |
| 6,986,030 | B2 | 1/2006 | Shmueli et al. | |
| 7,085,879 | B2 | 8/2006 | Aasheim et al. | |
| 7,143,420 | B2 | 11/2006 | Radhakrishnan | |
| 7,406,489 | B2 * | 7/2008 | Soini et al. | 707/610 |
| 7,747,837 | B2 | 6/2010 | Gorobets et al. | |
| 2004/0088417 | A1 | 5/2004 | Bober et al. | |
| 2004/0243793 | A1 | 12/2004 | Tang | |
| 2005/0160053 | A1 * | 7/2005 | Okamoto et al. | 705/67 |
| 2005/0193161 | A1 | 9/2005 | Lee et al. | |
| 2005/0203872 | A1 | 9/2005 | Kwong Kwan | |

(Continued)

FOREIGN PATENT DOCUMENTS

| GB | 2 400 707 | 10/2004 |
|---|---|---|
| WO | WO 01/88780 | 11/2001 |

(Continued)

OTHER PUBLICATIONS

Office Action for U.S. Appl. No. 12/059,107, dated Apr. 4, 2011, 9 pages.

(Continued)

*Primary Examiner* — Diem Cao
*Assistant Examiner* — Kimbleann Verdi
(74) *Attorney, Agent, or Firm* — Brinks Hofer Gilson & Lione (57) ABSTRACT

A number of applications can be run by the computing system. Such applications can execute independently from each other and can also each independently manage a corresponding set of content stored on a local storage device (LSD). One of the advantages presented by the invention is the ability of the LSD to inform one application of the content made available on the LSD by another one of the applications even though the applications have no relationship to each other. In this way, a synergy between the independent applications can be achieved providing a co-operative environment that can result in, for example, improved operation of the computing system, improved resource (i.e., memory, bandwidth, processing) allocation and use, and other factors.

21 Claims, 4 Drawing Sheets

U.S. PATENT DOCUMENTS

| | | |
|---|---|---|
| 2005/0268339 A1 | 12/2005 | Bobrow |
| 2006/0079284 A1 | 4/2006 | Lu et al. |
| 2006/0107062 A1 | 5/2006 | Fauthoux |
| 2006/0107330 A1 | 5/2006 | Ben-Yaacov et al. |
| 2006/0288166 A1 | 12/2006 | Smith, Jr. et al. |
| 2007/0033373 A1 | 2/2007 | Sinclair |
| 2007/0038567 A1 | 2/2007 | Allaire et al. |
| 2007/0050538 A1 | 3/2007 | Northcutt et al. |
| 2007/0056042 A1 | 3/2007 | Qawami et al. |
| 2007/0156998 A1 | 7/2007 | Gorobets |
| 2007/0186279 A1 | 8/2007 | Zimmer et al. |
| 2007/0198634 A1 | 8/2007 | Knowles |
| 2007/0198715 A1 | 8/2007 | Knowles |
| 2007/0198716 A1 | 8/2007 | Knowles |
| 2007/0198734 A1 | 8/2007 | Knowles |
| 2007/0218945 A1 | 9/2007 | Agami et al. |
| 2008/0027983 A1 | 1/2008 | Erol et al. |
| 2008/0052781 A1* | 2/2008 | Bogot et al. ............ 726/26 |
| 2008/0096559 A1 | 4/2008 | Phillips et al. |
| 2008/0126680 A1 | 5/2008 | Lee et al. |
| 2008/0147962 A1 | 6/2008 | Diggs et al. |
| 2008/0270725 A1 | 10/2008 | Roden et al. |
| 2008/0301396 A1 | 12/2008 | Hamada et al. |
| 2009/0043984 A1 | 2/2009 | Chang et al. |
| 2009/0094160 A1 | 4/2009 | Webster et al. |
| 2009/0171891 A1 | 7/2009 | Nochimowski et al. |
| 2009/0171911 A1 | 7/2009 | Nochimowski et al. |
| 2009/0172050 A1 | 7/2009 | Nochimowski et al. |
| 2009/0172217 A1 | 7/2009 | Nochimowski et al. |
| 2009/0172274 A1 | 7/2009 | Nochimowski et al. |
| 2009/0172275 A1 | 7/2009 | Nochimowski et al. |
| 2009/0172276 A1 | 7/2009 | Nochimowski et al. |
| 2009/0172400 A1 | 7/2009 | Rave et al. |

FOREIGN PATENT DOCUMENTS

| | | |
|---|---|---|
| WO | WO 2005/125072 | 12/2005 |
| WO | WO 2007/019258 | 2/2007 |
| WO | WO 2007/044947 | 4/2007 |

OTHER PUBLICATIONS

Office Action for U.S. Appl. No. 12/029,356, dated Dec. 27, 2010, 13 pages.
Office Action for U.S. Appl. No. 12/029,356, dated Mar. 25, 2011, 40 pages.
Office Action for U.S. Appl. No. 12/019,573, dated Mar. 1, 2011, 33 pages.
Office Action for U.S. Appl. No. 12/123,304, dated Mar. 11, 2011, 12 pages.
Office Action for U.S. Appl. No. 12/101,065, dated Dec. 7, 2010, 8 pages.
Office Action for U.S. Appl. No. 12/101,065, dated Feb. 25, 2011, 8 pages.
Office Action for U.S. Appl. No. 12/177,006, dated Nov. 24, 2010, 11 pages.
Office Action for U.S. Appl. No. 12/177,006, dated Mar. 15, 2011, 8 pages.
Hennessy et al., *Computer Organization and Design*, Morgan Kaufmann Publishers, Inc., second edition, pp. 675-678, 1998.
Mani et al., SenSys '06, Nov. 1-3, 2006, Boulder, Colorado, USA ACM, pp. 425-426.
Sim Application Toolkit (SAT) [online], May 19, 2007 [retrieved on Dec. 13, 2010] from URL: http://www.sanjayahuja.com/tutorials/SimApplicationToolkit.html, 1 page.
Zeinalipour-Yazti et al., "MicroHash: An Efficient Index Structure for Flash-Based Sensor Devices," FAST 05, pp. 1-14, 2005.
Search Report dated Sep. 10, 2010 in EP Application No. 10 007 973.0.
Office Action dated Oct. 6, 2010 in U.S. Appl. No. 12/059,107.
Office Action dated Oct. 5, 2010 in U.S. Appl. No. 12/123,304.
Office Action dated Sep. 3, 2010 in U.S. Appl. No. 12/123,252.
International Search Report dated Aug. 7, 2009 in PCT Application No. PCT/US2008/087695.
Written Opinion dated Aug. 7, 2009 in PCT Application No. PCT/US2008/087695.
Potter et al., "WebPod: Persistent Web Browsing Sessions with Pocketable Storage Devices," Proceedings of the 14$^{th}$ International Conference on the World Wide Web, [Online] May 14, 2005, pp. 603-612.
Lahti et al., "A Mobile Phone-based Context-aware Video Management Application," Proceedings of SPIE—The International Society for Optical Engineering 2006 SPIE, vol. 6074.
Ravi et al., "Securing Pocket Hard Drives," IEEE Pervasive Computing, IEEE Service Center, Los Alamitos, CA, vol. 6, No. 4, Oct. 1, 2007, pp. 18-23.
Anciaux et al., "A Tamper-Resistant and Portable Healthcare Folder," International Journal of Telemedicine and Applications, vol. 2008, 9 pgs., 2008.
Office Action for U.S. Appl. No. 12/019,573, dated Dec. 8, 2011, 27 pages.
Office Action for U.S. Appl. No. 12/045,472, dated May 9, 2011, 12 pages.
Notice of Allowance for U.S. Appl. No. 12/045,472, dated Oct. 27, 2011, 5 pages.
Office Action for U.S. Appl. No. 12/059,107, dated Jan. 3, 2012, 7 pages.
Office Action for U.S. Appl. No. 12/123,252, dated Apr. 11, 2011, 12 pages.
Office Action for U.S. Appl. No. 12/123,252, dated Oct. 21, 2011, 13 pages.
Office Action for U.S. Appl. No. 12/177,006, dated Dec. 6, 2011, 10 pages.
Examiner's Report for European Patent Application Serial No. 08 870 111.5, dated Jan. 20, 2011, 6 pages.
European Search Report for European Patent Application Serial No. 10 007 974.8, dated Jan. 20, 2011, 6 pages.
Baird et al., "Distributed Information Storage Architecture," Twelfth IEEE Symposium on Mass Storage Systems, 1993, pp. 1051-9173.
Melazzi et al., "The Simplicity Project: easing the burden of using complex and heterogeneous ICT devices and services," URL: http://www.ist-simplicity.org/_publications/Mobile%20Summit%202004%20-%20Paper%20State%20of%20Art.pdf, 8 pages, Jun. 2004.
U.S. Appl. No. 11/964,060, filed Dec. 26, 2007.
U.S. Appl. No. 11/967,938, filed Dec. 31, 2007.
Wang, Jinghua, "VHE Smart Card Manager," URL: http://jerry.c-lab.de/vhelab/r_smartcard.html, Feb. 7, 2003.
www.allinyourpocket.com, "All your files in your pocket!" downloaded Apr. 15, 2008.
Office Action for U.S. Appl. No. 12/101,065, dated Feb. 9, 2012, 9 pages.
Ex Parte Quayle Action for U.S. Appl. No. 12/019,573, dated Jul. 17, 2012 (5 pages).
Office Action for U.S. Appl. No. 12/101,065, dated Jun. 19, 2012 (10 pages).
Office Action for U.S. Appl. No. 12/123,252, dated Jul. 2, 2012 (13 pages).
Notice of Allowance for U.S. Appl. No. 12/177,006, dated May 30, 2012 (10 pages).
Office Action for U.S. Appl. No. 13/355,146, dated Jul. 16, 2012 (17 pages).
Kubiatowicz et al., "OceanStore: An Architecture for Global-Scale Persistent Storage", A.C.M., 2000, pp. 190-201.

* cited by examiner

CACHE MANAGEMENT

CROSS REFERENCE TO RELATED APPLICATIONS

This patent application takes priority under 35 U.S.C. 119(e) to (i) U.S. Provisional Patent Application No. 61/018,644 filed on Jan. 2, 2008 entitled "DISTRIBUTED STORAGE SERVICE SYSTEMS AND ARCHITECTURE" by Nochimowski et al., and (ii) U.S. Provisional Patent Application No. 61/018,979 filed on Jan. 4, 2008 entitled "DISTRIBUTED STORAGE SERVICE SYSTEMS AND ARCHITECTURE" by Nochimowski et al., each of which are incorporated by reference in their entirety for all purposes.

This application is related to co-pending U.S. patent application Ser. Nos., i) Ser. No. 12/029,356 entitled "STORAGE DEVICE HAVING DIRECT USER ACCESS," by Nochimowski et al., filed Feb. 11, 2008; ii) Ser. No. 12/045,472 entitled "DIGITAL CONTENT DISTRIBUTION AND CONSUMPTION," by Rave et al., filed Mar. 10, 2008; iii) Ser. No. 12/101,065 entitled "STORAGE DEVICE HAVING REMOTE STORAGE ACCESS", by Nochimowski et al., filed Apr. 10, 2008; iv) Ser. No. 12/059,107 entitled "DATA USAGE PROFILING BY LOCAL STORAGE DEVICE," by Mochimowski et al, filed Mar. 31, 2008; v) Ser. No. 12/123,252 entitled "DATA INDEXING BY LOCAL STORAGE DEVICE," by Nochimowski et al., filed May 19, 2008; vi) Ser. No. 12/123,304 (now abandoned) entitled "DATA INDEXING BY LOCAL STORAGE DEVICE," by Nochimowski et al., filed May 19, 2008; vii) Ser. No. 11/967,938 entitled "LOCAL PROXY SYSTEM AND METHOD" by Mosek et al., filed Dec. 31, 2007 ; and viii) Ser. No. 12/019,573 entitled DISTRIBUTED STORAGE SERVICE SYSTEMS AND ARCHITECTURE" by Nochimowski et al., filed Jan. 24, 2008 , all of which are incorporated by reference for all purposes.

FIELD OF THE INVENTION

The present invention relates generally to digital devices. More particularly, the present invention relates to cache management.

BACKGROUND

Internet technology is, has been and still remains, a rapidly developing field, particularly in the area of network optimization and in particular for improving the end-user browsing experience. In computer networks, a proxy server is a server (a computer system or an application program) which services the requests of its clients (e.g. request for a web page, connection establishment, etc.) by forwarding the requests to other servers, typically web servers.

An Internet application (e.g., a FTP client that uses the FTP protocol or any other Internet application such as a WEB browser) usually manages at least two relevant interfaces, a first interface to a local mass storage device referred to as a mass storage interface through which the internet application manages content stored in a cache by way of a cache manager using a host device file system (HDFS). More generally, however, any number of internet applications can each manage their own content stored in the local mass storage device through their respective logical interfaces where each of these individual storage areas are managed by their own set of rules. In the case where a representative internet application takes the form of a browser application, the browser cache manager uses a set of rules, also referred to as browser cache policies, to serve the browser with appropriate content. In order to improve response time and preserve network bandwidth, the browser cache will typically store content based upon the relevant rule(s) set forth by the cache policies. For example, the browser cache manager (following the relevant cache policies established for a particular browser) can store content (in the form of a WEB page for example) based upon previously retrieved WEB pages in anticipation that the browser is likely to request that particular WEB page again in the near future. In this way, instead of using valuable network resources, the browser cache manager can retrieve the relevant WEB page stored locally in the browser cache.

Another interface used by the internet application can be used for internet connectivity such as management of HTTP commands that are carried over a network connection in communication with a network resource that can be either a local resource or a remote resource. In the case of mobile browsing the browser usually gets access to the remote resource/server through a proxy server that can perform content optimization/adaptation/filtering/compression, and so on in order to preserve valuable mobile link resources. Proxy servers can also be used in enterprise systems that require additional tasks such as access control on the edge of the Internet. Another value lies in the management of a proxy cache that can apply 'content pre-fetching techniques" so as to pre-cache content "on the edge of the Internet" (i.e., closer to the user's browser). In this way, the browsing experience can be accelerated since requested content is on hand when needed.

However, since the browser cache and the proxy cache are managed independently of each other, there can be little or no "learning" from or about each other's cache policies. Therefore, there can be no overall cache management policy since the proxy cache and the browser cache are guided by their own set of rules that may or may not be known to the other since the browser application and the proxy can be supplied by different vendors. This lack of overall cache management policy can create inefficiencies that can result in a less than optimal browsing experience due to, in part, the inefficient allocation of storage resources. Such inefficiencies can include, for example, duplicating content stored in both the proxy cache and the browser cache, resulting in an inefficient use of network and storage resources (i.e., unnecessarily sending the browser content over the network link).

A proposed solution includes integrating a client agent on the mobile handset in order to synchronize between the browser and the proxy cache. However, since the client agent is typically application specific its use is limited to specific platforms. Due in part to the heterogeneity of host operating systems, particularly in mobile platforms, the usefulness of the client agent may be quite limited. This heterogeneity is made even worse in the case of a "closed" operating systems (such as Nucleus) as opposed to that of "open" operating systems such as Windows, Symbian, and the like. Since different mobile handsets may run on different operating systems, such implementation typically requires complex software integration. This software integration may prove even more complex when using mobile handsets that run on non-open operating systems.

Therefore, a method, system, and apparatus that overcomes the limitations besetting the internet application experience that includes mobile web browsing.

SUMMARY OF THE DESCRIBED EMBODIMENTS

According to different embodiments of the present invention, various methods, devices and systems are described for providing improved internet application (such as a browser) performance. One embodiment describes a local storage device (LSD). The LSD includes at least a memory array logically arranged to include at least a first portion and at least a second portion that are managed independently of each other. A first application manages first application content in the first portion and a second application manages second application content in the second portion. The first and the second applications execute independently from each other and the managing of the first application content by the first application is independent of the managing of the second application content by the second application. The LSD informs the second application of the first application content stored in the first portion independently from a host device.

In another embodiment, a computing system is described that includes at least a host device that includes a host device file system (HDFS) and a network interface, a local storage device LSD that includes a memory array logically arranged to include at least a first portion and at least a second portion wherein the first and the second portions are managed independently of each other. The first portion is managed by the HDFS such that the first application uses the HDFS to manage the first application content in the first portion, and the second portion is not managed by the HDFS such that the second portion is invisible to the HDFS. The first and the second applications execute independently of each other, and the managing of the first application content by the first application is independent of the managing of the second application content by the second application. The LSD informs the second application of the first application content available in the first portion where the informing is independent of the HD..

A method performed by a local storage device (LSD) is described. The LSD includes a memory array logically arranged to include at least a first portion and at least a second portion wherein the first and the second portions are managed independently from each other where a first application manages first application content in the first portion and where a second application manages second application content in the second portion. The first and the second applications execute independently of each other, and the managing of the first application content by the first application is independent of the managing of the second application content by the second application. The method is performed by at least the following operations: informing the second application by the LSD of the first application content stored in the first portion independent of a host device.

In another embodiment, computer program product executed by a system that includes a local storage device (LSD) in communication with a host device (HD) js described. The LSD includes a memory array logically arranged to include at least a first portion and at least a second portion that are independent of each other. A first application manages first application content in the first portion and a second application manages second application content in the second portion. The first and the second applications execute independently from each other, and the managing of the first application content by the first application is independent of the managing of the second application content by the second application. The computer program product includes computer code for informing the second application by the LSD of the first application content stored in the first portion where the informing is independent of the HD, and computer readable medium for storing the computer code.

DETAILED DESCRIPTION OF THE DESCRIBED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The local storage device discussed herein may be compatible with any memory card format, such as a secured digital (SD) memory card format used for managing digital media such as audio, video, or picture files. The storage device may also be compatible with a multi media card (MMC) memory card format, a compact flash (CF) memory card format, a flash PC (e.g., ATA Flash) memory card format, a smart-media memory card format, or with any other industry standard specifications. One supplier of these memory cards is SanDisk Corporation of Milpitas, Calif. The nonvolatile memory retains its memory or stored state even when power is removed. The storage device may also apply to other erasable programmable memory technologies, including but not-limited to electrically-erasable and programmable read-only memories (EEPROMs), EPROM, MRAM, FRAM ferroelectric and magnetic memories. Note that the storage device configuration does not depend on the type of removable memory, and may be implemented with any type of memory, whether it being a flash memory or another type of memory. The storage device may also be implemented with a one-time programmable (OTP) memory chip and/or with a 3 dimensional memory chip technology.

Host systems with which such memory cards are used include cellular telephones, personal computers, notebook computers, hand held computing devices, cameras, audio reproducing devices, and other electronic devices requiring removable data storage. Flash EEPROM systems are also utilized as bulk mass storage embedded in host systems. The storage device may be part of a local proxy system that may be implemented on PDAs (Personal Digital Assistants), mobile handsets, and other various electronic devices. A PDA is typically known as user-held computer systems implemented with various personal information management applications, such as an address book, a daily organizer, and electronic notepads, to name a few.

The invention will now be described in terms of specific embodiments all of which are in keeping with the spirit and scope of the invention. It should be noted that any functional blocks or functional arrangements described herein can be implemented as either a physical entity or as a logical entity, or as a combination of both.

Embodiments of the invention are discussed below with reference to FIGS. 1-4. However, those skilled in the art will readily appreciate that the detailed description given herein with respect to these figures is for explanatory purposes as the invention extends beyond these limited embodiments. It should be noted that the invention can be implemented using a computing system described in U.S. patent application Ser. No. 12/019,573 filed on Jan. 24, 2008 entitled "DISTRIBUTED STORAGE SERVICE SYSTEMS AND ARCHITECTURE" by Nochimowski et al., that is incorporated by reference in their entirety for all purposes.

As described herein, a computing system can include a host device (HD) and a local storage device (LSD). The LSD can function concurrently as either as a mass storage device or as a network accessible device. In this way, a number of applications can be run by the computing system. Such applications can execute independently from each other and can also each independently manage a corresponding set of content stored on the LSD. It should be noted that managing content can include any number of operations performed by or on content stored on the LSD. Such operations can include, but are not limited to, reading data, writing data, erasing data, copying data, formatting data, and so on. One of the advantages presented by the invention is the ability of the LSD to inform one application of the content made available on the LSD by another one of the applications even though the applications have no relationship to each other. In this way, a synergy between the independent applications can be achieved providing a co-operative environment that can result in, for example, improved operation of the computing system, improved resource (i.e., memory, bandwidth, processing) allocation and use, and other factors.

Figure 1:
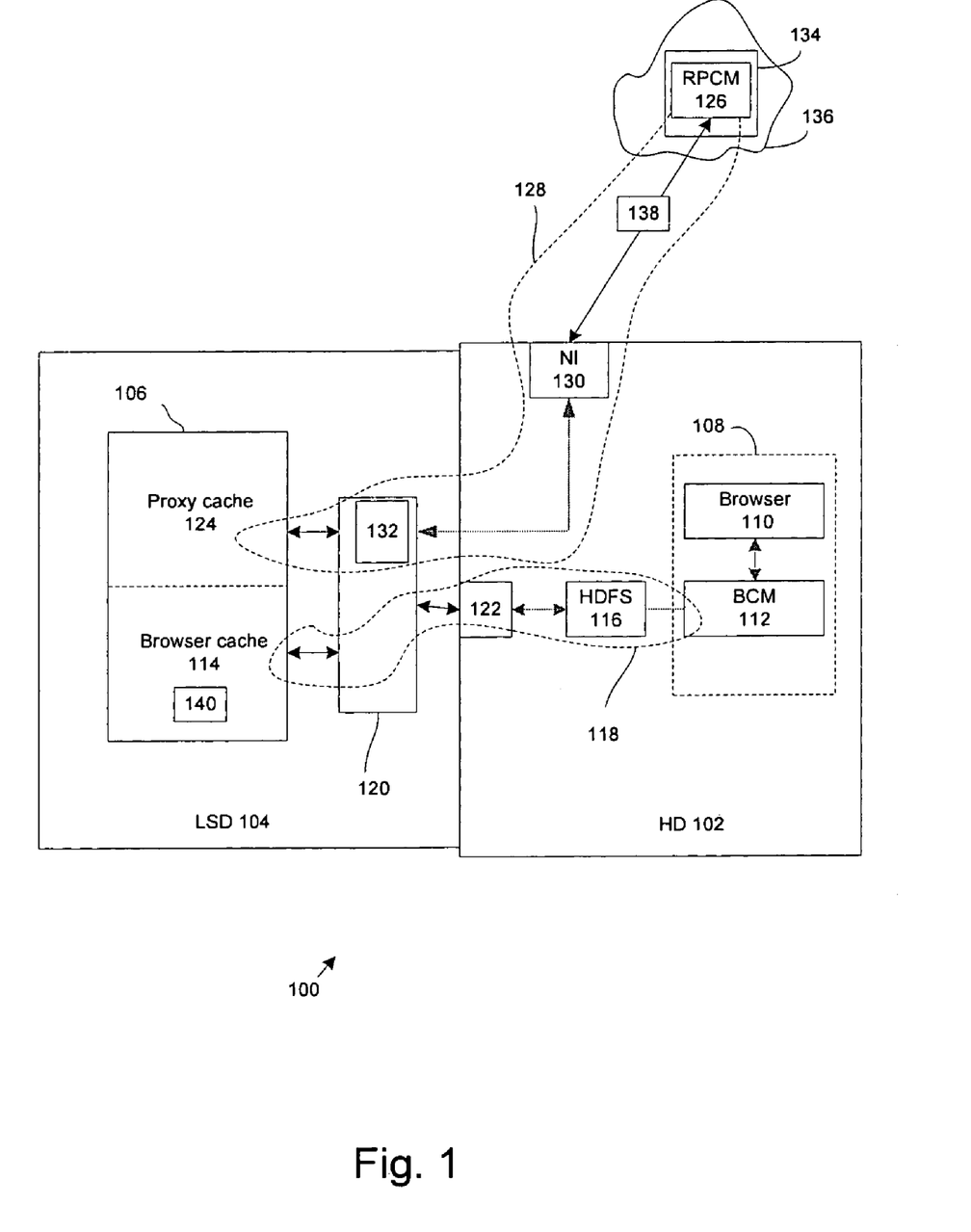
FIG. 1 shows representative computing system in accordance with the invention.

For example, FIG. 1 illustrates computing system 100 in accordance with an embodiment of the invention. System 100 includes host device (HD) 102 in communication with LSD 104 having memory array 106. HD 102 can be executing applications 108. Applications 108 can include internet applications such as browser application 110 having browser cache manager BCM 112 managing an associated local (browser) cache 114 on LSD 104. BCM 112 can manage browser cache 114 by way of HDFS 116 using what can be referred to as mass storage path 118 that can include memory controller 120 and LSD driver 122. LSD 104 can include proxy cache 124 managed by remote proxy cache manager (RPCM) 126 by way of network path 128 that includes network interface 130. It should be noted, that network path 128 can be established by HD 102 at the prompting of LSD 104 independent of HDFS 116. Furthermore, once network path 128 is established by HD 102, there is no further intervention by HD 102 except for any maintenance of network path 128 (and any other "housekeeping" duties).

It should be noted that RPCM 126 can be implemented along the lines presented in co-pending U.S. patent application Ser. No. 11/967,938 entitled "LOCAL PROXY SYSTEM AND METHOD" by Mosek et al which is incorporated by reference in its entirety where local proxy 132 resides on LSD 104 and RPCM 126 resides at remote device (RD) 134 included in network 136. During operation, RPCM 126 can push pre-fetched content 138 directly to LSD 104 in a pre-emptive manner. By pre-emptive manner, it is meant that pre-fetched content 138 can be pushed to LSD 104 prior to any actual request by BCM 112 for content 138 thereby obviating the need for an actual request to be sent to RPCM 126 over network path 128. In this way, network bandwidth can be preserved.

Clearly then BCM 112 and RPCM 126 are used differently. For example, BCM 112 can act through mass storage path 118 to locally cache content 140 already requested by browser application 110 into browser cache 114 in LSD 104. Meanwhile, RPCM 126 typically performs functions in support of BCM 112 such as content pre-fetching (i.e., retrieving content before that particular content is requested). However, BCM 112 and RPCM 126 are typically provided by different vendors, and therefore BCM 112 and RPCM 126 most likely have different caching policies. Moreover, since mass storage path 118 and network path 128 do not cross (i.e., communicate with) each other, BCM 112 and RPCM 126 can not function in a synchronized manner.

This lack of synchronicity is clearly sub-optimal in terms of overall performance of BCM 112/RPCM 126. For example, RPCM 126 can be storing content already stored by BCM 112 (and vice versa) thereby wasting precious memory, processing, and bandwidth resources. This waste of resources can be especially problematic in mobile environments where most or all resources can be at a premium. However, the invention provides for RPCM 126 and BCM 112 to co-operate in a fashion unavailable to conventionally arranged systems. For example, LSD 104 can inform RPCM 126 of the type and nature of browser content 140 that BCM 112 is caching to browser cache 114. In this way, RPCM 126 can, for example, automatically pre-fetch any pages corresponding to the links of those pages already cached in browser cache 114 by BCM 112. In addition, RPCM 126 can avoid duplicating the effort required to cache content 140 already stored in browser cache 114, further reducing any unproductive use of valuable resources. Furthermore, RPCM 126 can "reverse-engineer" the caching policy of the BCM 112 thereby improving the ability of RPCM 126 to predict BCM 112 actions and thereby improve overall efficiency of the interaction of RPCM 126 and BCM 112 This improvement in efficiency can result in a substantial improvement in an end user's Internet experience.

Figure 2:
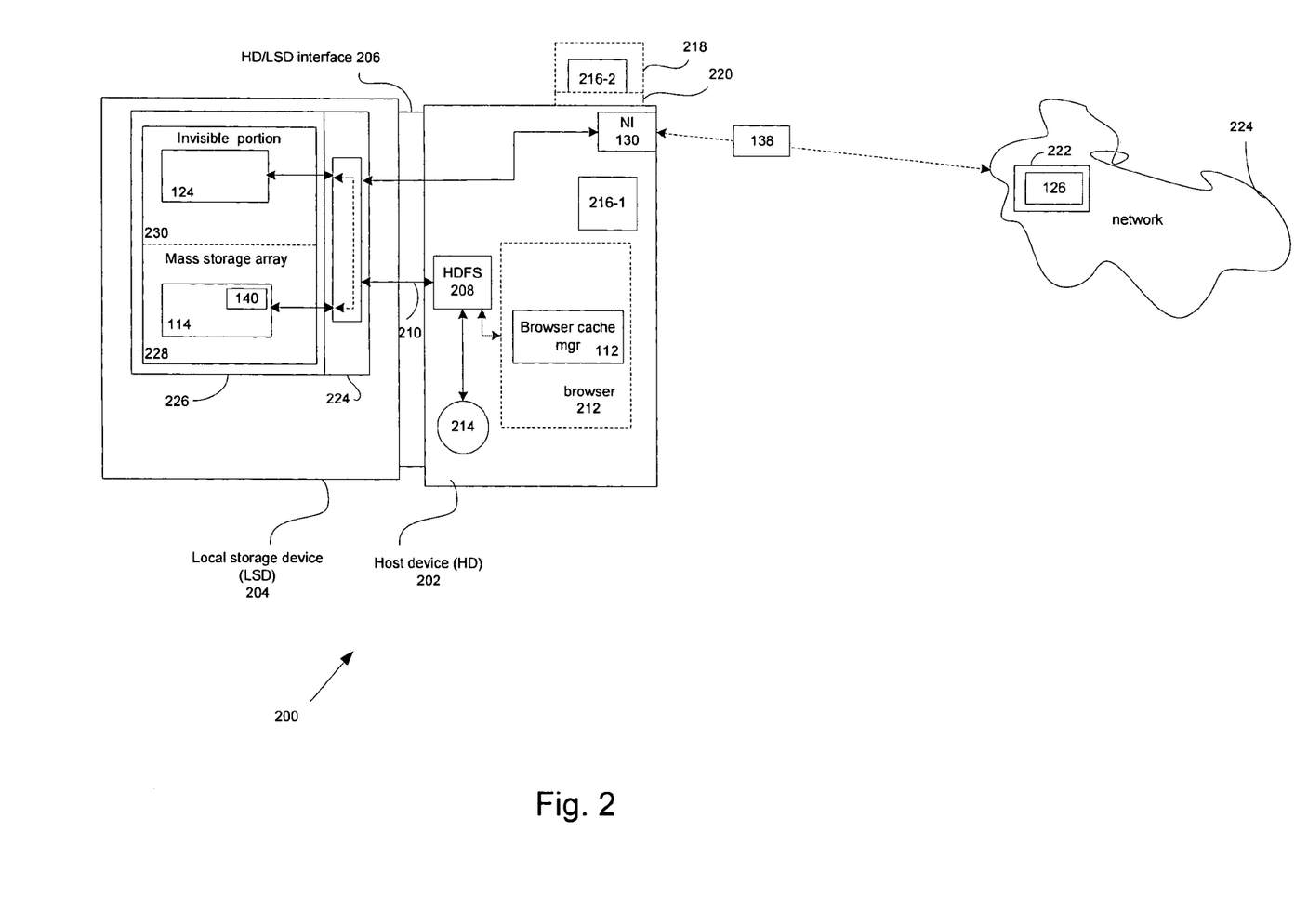
FIG. 2 illustrates a specific implementation of the computing system shown in FIG. 1

FIG. 2 shows a system 200 illustrating a specific embodiment of system 100 shown in FIG. 1. System 200 can include host device (HD) 202 connected to or otherwise in communication with local storage device (LSD) 204. HD 202 and LSD 204 can communicate with HD 202 by way of HD/LSD interface 206. LSD 204 can take the form of removable memory devices such as a memory card having a relatively small form factor and can be used to store digital data for electronics products such as cameras, hand-held or notebook computers, network cards, network appliances, set-top boxes, hand-held or other small audio players/recorders (e.g., MP3 devices), and medical monitors. Examples of a memory card include PC Card (formerly PCMCIA device), Flash card (e.g., Compact Flash Type I and II), Secure Digital (SD) card, Multimedia card (MMC), ATA card (e.g., Compact Flash card), memory stick, SmartMedia card. In addition, LSD 204 can take the form of non-removable memory devices such as SD compatible iNAND™ embedded Flash drive manufactured by SanDisk Corporation of Milpitas Calif.

It should be noted that HD/LSD interface 206 can be configured as a mechanical entity (such as a socket or interconnecting bus) into which HD 202 and LSD 204 can mechanically connect. In some embodiments, HD/LSD 206 can take the form of a wireless interface. HD 202 includes a processor, however, for the sake of clarity, the processor included in HD 202 is neither shown nor mentioned further in this discussion but is, nonetheless, presumed to be present. LSD 204 can be physically connected exclusively to HD 202 and therefore cannot access or otherwise communicate with circuits and/or applications external to system 200 without intervention by HD 202. Typically, LSD 204 does not utilize any interface to a device external to HD 202 other than that interface provided by the HD 202.

HD 202 includes host device file system (HDFS) 208. HDFS 208 can issue LSD management command 210 that can be passed to LSD 204 by way of LSD driver (not shown) and HD/LSD interface 206. For example, LSD management command 210 can take the form of a block command in those cases where LSD 204 is configured to include a data storage area having logical block address (LBA) architecture. System 200 can also have a number of applications resident on either LSD 204 or HD 202 that can execute independent of each other. In addition, each of the applications can manage their own particular cache of data on LSD 204 each of which is also independent of the other. Such applications can include, for example, Internet applications such as browser 212 supported by BCM 112 that can utilize HDFS 208 to communicate with LSD 204 using mass storage path 118 discussed above. In addition to browser application 212, independent applications 214 can utilize HDFS 208 to communicate with LSD 204 and is therefore "visible" to HDFS 208. In contrast to applications 214, however, certain independent applications do not utilize mass storage path 118 to store data in LSD 204. Such applications can be referred to as external, or target, application 216 and are therefore not "visible" to HDFS 208.

In the described embodiment, target application 216 can reside in any number of locations and devices, either locally or remotely. Such locations and devices can include, for example, HD 202 (having local application 216-1), or any device external to HD 202 and LSD 204 but still within system 200 such as external device 218 (in which resides local application 216-2). In the described embodiment, external device 218 can take the form of a second LSD 218 coupled by way of interface 220 to HD 202. Moreover, such locations and devices can also include remote device 222 (in which resides remote application 216-3 that can take the form of RPCM 126 suitable for managing proxy cache 124).

LSD 204 can include controller 224 and data storage area 226. Data storage area 226 can be logically arranged to include at least mass storage area 228 managed by HDFS 208 using mass storage path 118. In a particularly useful arrangement, mass storage area 228 can be a LBA based mass storage area. Data storage area 226 can also be logically arranged to include a portion 230 that is invisible to HDFS 208. By invisible to HDFS 208 it is meant that invisible portion 230 is not managed by HDFS 208 and is therefore not directly accessible to HDFS 208.

Mass storage area 228 can be further logically arranged to include browser cache 114 that can include browser content 140 provided by BCM 112 in support of browser 212. By caching information previously used by browser 212 locally at browser cache 114, the amount of network bandwidth used to provide browser 212 is reduced. The reduction of mobile network bandwidth can be essential to the efficient operation of a mobile network especially since available network bandwidth may be limited. Invisible portion 230 can be logically arranged to include proxy cache 124.

An issue related to the performance of the caching mechanism is caching policy which decides how content is brought into and removed from the cache. Caching policies are typically formed of optimizing instructions promulgated by application developers that are followed in order to manage a cache of information stored on the computer. Cache size is usually limited, and if the cache is full, the caching policy must choose which items to discard to make room for the new ones. The most efficient caching algorithm (also referred to as a caching heuristic) would be to always discard the information that will not be needed for the longest time in the future. Since it is impossible to predict how far in the future information will be needed, this is not practical. The practical minimum can be calculated only after experimentation, and one can compare the effectiveness of the actually chosen cache algorithm with the optimal minimum. Examples of various caching policies include Least Recently Used (LRU), Most Recently Used (MRU), Psuedo-LRU, and Adaptive Replacement Cache (ARC).

In addition to the temporal nature of the resources stored in cache, the nature of the content itself stored can also be an important consideration. The nature of the content stored can be items with different cost (keep items that are expensive to obtain, e.g. those that take a long time to get) or items taking up more cache (if items have different sizes, the cache may want to discard a large item to store several smaller ones), as well as items that expire with time. All or only some of these considerations can be taken into account in varying degrees when an application developer formulates a caching policy to be applied to a cache associated with an application.

In the case of browser 212, the appropriate caching policy applied to browser cache 114 can depend upon any or all of the above mentioned considerations particularly when viewed in the light of the mobile environment in which browser 212 will be used. Since browser 212 will be used in a mobile environment, special consideration can be given to those items that present an especially large burden when it comes to network traffic, available bandwidth, etc. Therefore a browser developer will create a browser cache policy specifically tailored to optimize the performance of browser 212 when used in a mobile WEB environment. Any caching policy applied to proxy cache 124 can be very different than that caching policy applied to browser cache 114. The potential mis-match between proxy cache caching policy and the browser cache caching policy can present substantial inefficiencies and loss of performance exhibited by browser 212. For example, proxy cache caching policy applied to proxy cache 124 may be directed at preserving available cache memory space at the expense of "freshness" of a resource stored therein, whereas browser caching policy applied to browser cache 114 may be directed at just the opposite, focusing on retaining the "freshest" resource at the expense of any other factor. Therefore, in this example, proxy cache caching policy and browser cache caching policy are working at cross purposes creating, in the process, a basic conflict in the operation of proxy cache 124 and browser cache 114. Clearly, it would be desirable for proxy cache 124 and browser cache 114 to work in concert as much as is practicable in order to improve overall efficiency and utilization of the local cache system.

One of the features of the invention is that LSD 204 can deduce (i.e., reverse engineer) the browser cache caching policy based upon the nature of the data stored in browser cache 114 (i.e., size of files, kind of files) and the dynamics of the data stored in browser 114 (i.e., length of retention of files). For example, a comparison can be made between a current state of browser cache content 140 and any number of previous states of browser cache content 140. In this way, a pattern indicating a change of state over time of browser cache content 140 can be developed. This pattern can then be used by LSD 204, for example, to deduce the browser cache caching policy. For example, if LSD 204 determines that browser cache 114 is discarding the least recently used items first, then LSD 204 can deduce that browser cache 114 is being directed by a browser cache caching policy structured along the lines of a LRU type caching policy. On the other hand, if LSD 204 deduces that browser cache 114 is discarding the most recently used items first, then LSD 204 can deduce that browser cache 114 is following a cache policy structured along the lines of a MRU type caching policy. In any case, once LSD 204 has deduced a browser cache caching policy, LSD 204 can then use the deduced browser cache caching policy to modify the proxy cache caching policy resulting in an overall improvement in efficiency of the local cache system.

For example, if LSD 204 has deduced that browser cache 114 is following an LRU type caching policy, then LSD 204 can modify the proxy cache caching policy to preferentially discard the least recently used proxy cache content. In this way, overall content duplication can be reduced improving overall utilization of the local cache system. Conversely, if LSD 204 deduces that browser cache 114 is following an MRU type caching policy, then LSD 204 can modify the proxy cache caching policy to preferentially discard the most recently used proxy cache content. In any case, LSD 204 has the freedom to modify proxy cache caching policy as deemed appropriate.

For example, in the mobile WEB environment, an important use of proxy cache manager is to perform web page pre-fetching. Since browser sits on the edge of the Internet closest to the end user any improvement in browser performance can substantially enhance an end user's overall browsing experience. Therefore, by modifying the cache policy used to direct the operations of proxy cache manager, proxy cache manager can improve observed browser performance by, for example, automatically pre-fetching proxy cache content (such as a WEB page) associated with browser cache content already stored in browser cache. For example, if Page P is stored in browser cache, then proxy cache can automatically pre-fetch any WEB pages appearing on the links of page P (i.e. pages P+1 and so on).

Figure 3:
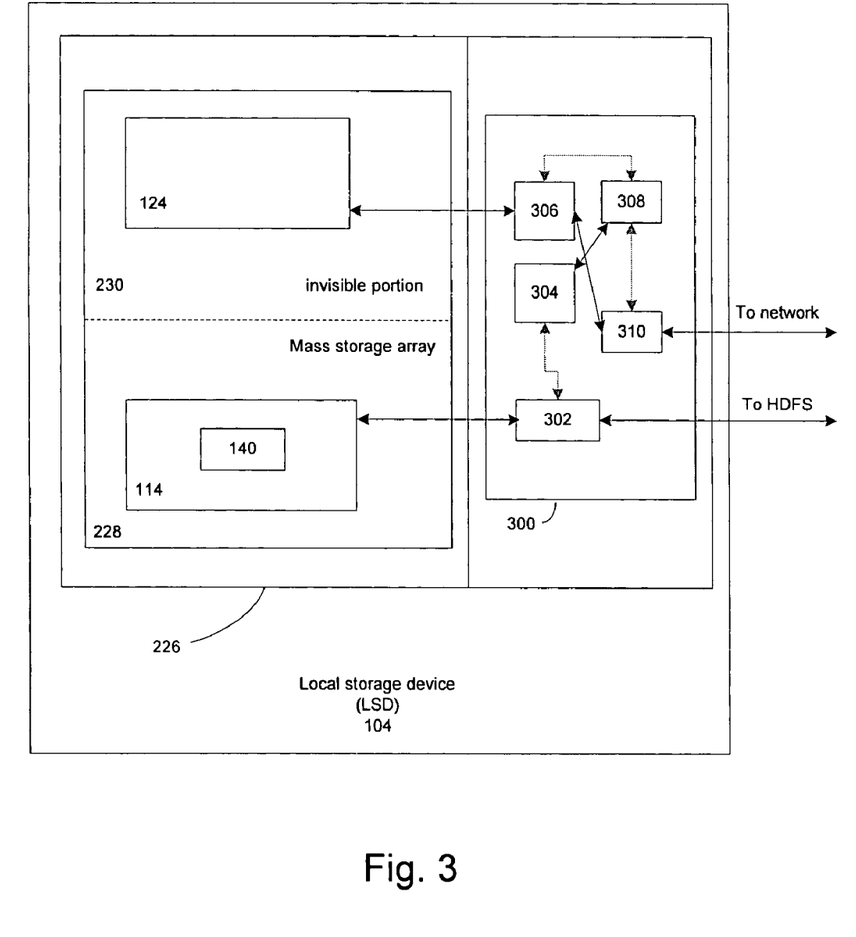
FIG. 3 shows a representative implementation of a local storage device in accordance with an embodiment of the invention.

FIG. 3 shows representative controller 300 included in LSD 104 in accordance with an embodiment of the invention. Controller 300 is a particular embodiment of controller 120 shown in FIG. 1 showing various functional blocks representative of applications run on controller 120. Accordingly, controller 300 includes management block 302 in communication with HDFS 208. Management block 302 is, in turn, in communication with mass storage filter block 304. Mass storage filter block 304 communicates with both internet file manager block 306 and proxy cache manager block 308. Both internet file manager block 306 and proxy cache manager block 308 can each communicate with proxy server block 310. In the described embodiment, mass storage filter block 304 can provide information to proxy cache manager block 308 about browser cache content 140 stored in browser cache 114. There are a number of techniques that can be used to infer the nature of the stored content and to communicate this inference to the RPCM. One technique provides for determining a name associated with a stored content file and its corresponding file extension (such as ".htm"). Once this information is known, it can be communicated to the RPCM. Proxy cache manager block 308 can be local to LSD 104. In some implementations, proxy cache manager block 308 can reside in a remote device such as remote proxy server 126.

Figure 4:
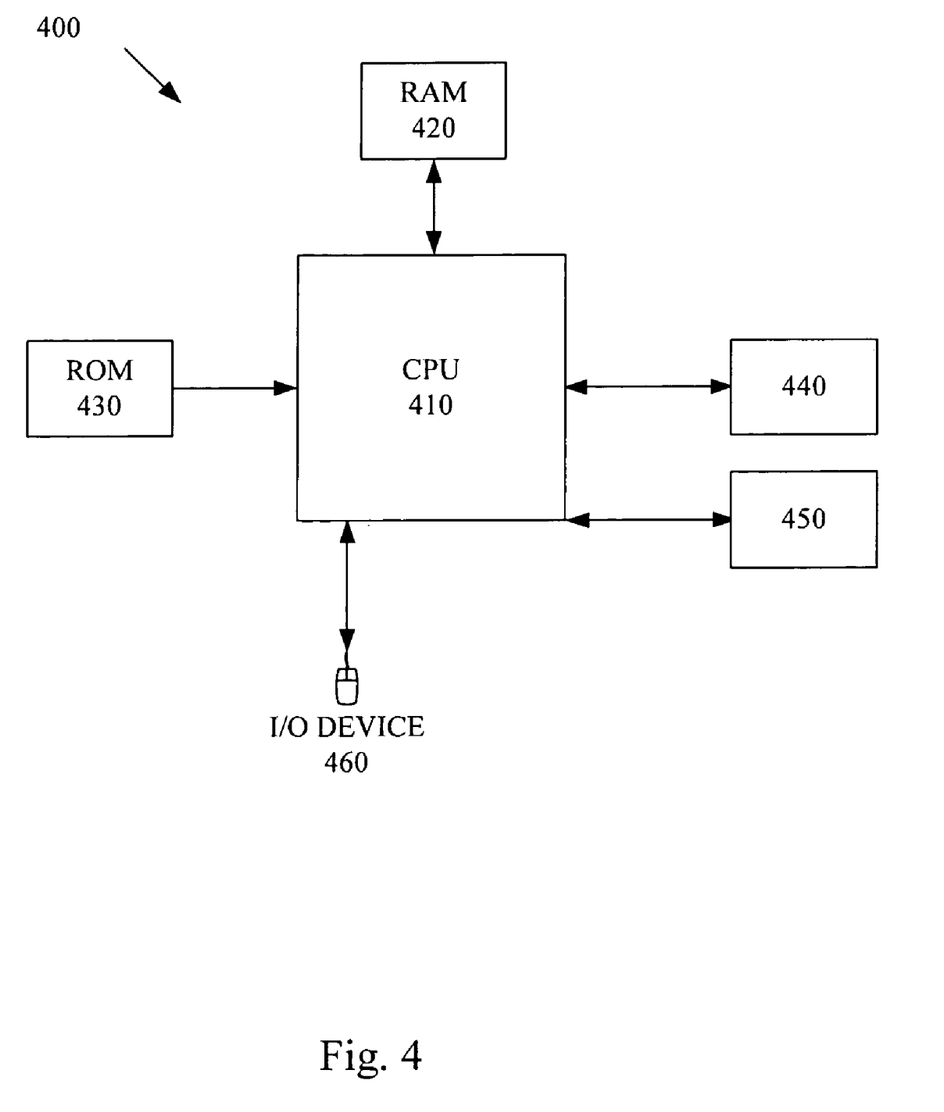
FIG. 4 shows a representative system illustrating additional components typically found in host device.

FIG. 4 shows a representative system 400 illustrating additional components typically found in host device 202. System 400 includes central processing unit (CPU) 410, random access memory (RAM) 420, read only memory (ROM) 430, and primary storage devices 440 and 450. As is well known in the art, ROM 430 acts to transfer data and instructions unidirectionally to the CPU 410, while RAM 420 is used typically to transfer data and instructions in a bi-directional manner. CPU 410 may generally include any number of processors. Both primary storage devices 440 and 450 may include any suitable computer-readable media. CPUs 410 are also coupled to one or more input/output devices 460 familiar to those of skill in the computer hardware and software art In the described embodiment, mobile devices (e.g., portable media devices) can communicate with one another. This type of communication can be referred to as peer-to-peer interaction. In this regard, one mobile device can communicate (e.g., unicast) directly with another mobile device. In another example, one mobile device can communicate (e.g., broadcast, anycast or multicast) to a plurality of other mobile devices. In the peer-to-peer environment, one mobile device can communicate with one or more other electronic devices (whether mobile or stationary) in the immediate vicinity. Data sharing can be performed when such communication is available.

Data transfer could be between a mobile device and a computing device, such as a home computer or another mobile device. Typically, the mobile device and the computing device would be associated with a particular user. For example, when the mobile device is within range of a home computer (or a home network), data transfer can be performed between the mobile device and the home computer. Data transfer could also be between two or more mobile devices, or between two or more non-mobile devices. The data transfer can be automatic without any user action or can alternatively require manual approval by a user. The network devices can be associated with one another via an identification number or other suitable mechanism.

A mobile device or non-mobile device capable of receiving, transmitting and/or managing data may be referred to as a "data device." The manner by which the data arrives at the data device can depend upon implementation. For example, the data can be directly transferred to the data device, or the data can be indirectly transferred to the data device. For example, the data transfer can be between one data device to another data device. Alternatively, one data device can cause another data device to transfer desired data to a recipient data device.

The shared data can be transferred to a recipient device by file transfer or streaming. The data transferred can be received by one or more data devices. Examples of data devices include a media player, PDA, a speaker unit, a wireless transmitter/receiver unit, etc. Users of data devices can also create and distribute content through data sharing. The streaming can be limited so as to restrict the number of data devices simultaneously receiving the data. On the other hand, if the users of the data devices are subscribers to the streaming content (i.e., have a subscription), then the streaming can be unlimited as to subscribers. Managing some portion of the media item content associated with the media item metadata may also be done to facilitate the streaming of media item content. For example, a user could begin playing such a previously stored portion of the media item content before streaming of the remaining content even begins.

Data can be shared after being purchased. For example, a recipient could purchase data from a remote server. The remote server would then cause the purchased data to be delivered to the recipient's data device. The purchase can be performed in real-time or can be deferred until a later point in time. Thereafter, the purchased data can be shared from the recipient's data device to another data device.

For example, in the work environment or other network environment, as a user comes into an employer's office to work, the user's mobile device can transfer data to the user's work computer or to a network server for the office. The data transfer can be automatic without any user action or can alternatively require manual approval by a user. The user of the mobile device can also communicate with mobile devices of coworkers or other users of the network to exchange data.

Regardless of the particular environment, the data transfer can be wireless. The wireless data transfer can be facilitated by a wireless network. One mobile device could wirelessly transmit data in a unicast fashion from one mobile device to another mobile device or stationary computing device. Still further, one mobile device could wirelessly transmit data in a multicast or broadcast fashion to a plurality of other mobile devices. It should be noted that any home-server computer can reside on any of a number of other data storage devices in a network to which computing device 200 belongs.

The advantages of the invention are numerous. Different embodiments or implementations may yield one or more of the following advantages. One advantage of the invention is legacy devices can be added or removed without consideration of modifying system hardware. Another advantage of the invention is that it can be used with any host computer without modification therefore reducing the cost and increasing the applicability of the invention.

The many features and advantages of the invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A local storage device (LSD), comprising:
   a memory array logically arranged to include at least a first portion and at least a second portion, wherein the first and the second portions are independent of each other; and
   a controller configured to execute a first application that manages first application content in the first portion based upon a first application content management policy and to execute a second application that manages second application content in the second portion based upon a second application content management policy;
   wherein the controller is configured to execute the first application independently of the second application, and wherein the first application manages the first application content independent of the second application managing the second application content;
   wherein the LSD is configured to inform, independent of a host device (HD), the second application of the first application content stored in the first portion;
   wherein the second application uses information provided to the second application by the LSD of the first application content stored in the first portion to deduce the first application content management policy;
   wherein the second application uses the deduced first application content management policy to update the second application content management policy; and
   wherein the second application uses the updated second application content management policy to predict an upcoming first application managing operation.

2. The local storage device of claim 1, wherein the second application initiates a second portion management operation based upon the predicted upcoming first application management operation.

3. The local storage device of claim 1, wherein the LSD is in communication with the HD, wherein the HD includes a host device file system (HDFS), and wherein the informing by the LSD is independent of the HDFS.

4. The local storage device of claim 3, wherein the first portion is managed by the HDFS, wherein the first application uses the HDFS to manage the first application content in the first portion, wherein the second portion is not managed by the HDFS, and wherein the second portion is invisible to the HDFS.

5. The local storage device of claim 1, wherein the HD includes a network interface that the HD uses to establish a communication path over which the second portion accesses a network, wherein once the HD establishes the communication path, there is no further intervention by the HD except to maintain the communication path.

6. The local storage device of claim 1, wherein the first application is a browser cache manager and wherein the second application is a proxy cache manager.

7. The local storage device of claim 6, wherein the second portion includes at least a proxy cache managed by the proxy cache manager, wherein the proxy cache manager manages proxy cache content in the proxy cache according to a proxy cache management policy.

8. The local storage device of claim 7, wherein the first portion includes at least a browser cache managed by the browser cache manager, wherein the browser cache manager manages browser cache content in the browser cache according to a browser cache management policy.

9. The local storage device of claim 8, wherein the proxy cache manager modifies the proxy cache management policy based upon information about the browser cache content provided by the LSD.

10. The local storage device of claim 9, wherein the proxy cache manager uses the modified proxy cache management policy to predict a browser cache operation.

11. The local storage device of claim 10, wherein the proxy cache manager uses the predicted browser cache operation to update the proxy cache content.

12. A local storage device (LSD) operatively coupled with a host device (HD) that includes a host device file system (HDFS) and a network interface, the local storage device comprising:
   a memory array logically arranged to include at least a first portion and at least a second portion, wherein the first and the second portions are independent from each other, and
   a controller configured to execute a second application that manages a second application content stored in the second portion based upon a second application content management policy;
   wherein the first portion is managed by the HDFS such that a first application uses the HDFS to manage a first application content in the first portion based upon a first application content management policy, wherein the second portion that is not managed by the HDFS is invisible to the HDFS, and wherein the first and the second applications execute independently from each other;
   wherein the managing of the first application content by the first application is independent of the managing of the second application content by the second application;
   wherein the LSD is configured to inform the second application of the first application content stored in the first portion, wherein the informing is invisible to the HDFS;
   wherein the second application uses information provided to the second application by the LSD of the first application content stored in the first portion to deduce the first application content management policy;
   wherein the second application uses the deduced first application content management policy to update the second application content management policy; and wherein the second application uses the updated second application content management policy to predict an upcoming first application operation.

13. The local storage device of claim 12, wherein the second application initiates a second portion operation based upon the predicted upcoming first application operation.

14. The local storage device of claim 12, wherein the HD uses the network interface to facilitate network access to the second portion.

15. The local storage device of claims 12, wherein the first application is a browser cache manager and wherein the second application is a proxy cache manager.

16. The local storage device of claim 15, wherein the second portion includes at least a proxy cache managed by the proxy cache manager, wherein the proxy cache manager manages proxy cache content in the proxy cache according to a proxy cache management policy, and wherein the first portion includes at least a browser cache managed by the browser cache manager, and wherein the browser cache manager manages browser cache content in the browser cache according to a browser cache management policy.

17. The local storage device of claim 16, wherein the proxy cache manager modifies the proxy cache management policy based upon information about the browser cache content provided by the LSD.

18. The local storage device of claim 17, wherein the proxy cache manager uses the modified proxy cache management policy to predict a browser cache operation.

19. The local storage device of claim 18, wherein the proxy cache manager uses the predicted browser cache operation to update the proxy cache content.

20. A computer program product executed by a system that includes a local storage device (LSD) in communication with a host device (HD), wherein the LSD includes a memory array logically arranged to include at least a first portion and at least a second portion wherein the first and the second portions are independent of each other, and wherein a first application manages first application content in the first portion based upon a first application content management policy and wherein a second application manages second application content in the second portion based upon a second application content management policy, wherein the first and the second applications are independent of each other, and wherein the managing of the first application content by the first application is independent of the managing of the second application content by the second application, the computer program product comprising:

computer code for informing the second application by the LSD of the first application content stored in the first portion, wherein the informing is independent of the HD;

computer code for deducing the first application content management policy by the second application using information provided to the second application by the LSD of the first application content stored in the first portion;

computer code for using the deduced first application content management policy by the second application to update the second application content management policy;

computer code for using the updated second application content management policy by the second application to predict an upcoming first application managing operation; and non-transitory computer readable medium for storing the computer code.

21. The computer program product of claim 20, further comprising:

computer code for initiating a second portion management operation by the second application based upon the predicted upcoming first application managing operation.

* * * * *